(12) United States Patent
Stoughton et al.

(10) Patent No.: US 9,385,360 B2
(45) Date of Patent: Jul. 5, 2016

(54) INTEGRATED STACKABLE BATTERY

(75) Inventors: Thomas B. Stoughton, Birmingham, MI (US); Robert S. Bucchi, Lake Orion, MI (US); Jerome O. Schroeder, Romeo, MI (US); Andrew H. Leutheuser, Sunnyvale, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 270 days.

(21) Appl. No.: 12/853,462

(22) Filed: Aug. 10, 2010

(65) Prior Publication Data
US 2012/0040221 A1 Feb. 16, 2012

(51) Int. Cl.
| | |
|---|---|
| *H01M 6/42* | (2006.01) |
| *H01M 2/20* | (2006.01) |
| *H01M 2/24* | (2006.01) |
| *H01M 2/26* | (2006.01) |
| *H01M 2/10* | (2006.01) |
| *H01M 10/647* | (2014.01) |
| *H01M 10/6551* | (2014.01) |
| *H01M 10/613* | (2014.01) |

(52) U.S. Cl.
CPC ............ *H01M 2/204* (2013.01); *H01M 2/1061* (2013.01); *H01M 10/613* (2015.04); *H01M 10/647* (2015.04); *H01M 10/6551* (2015.04)

(58) Field of Classification Search
None
See application file for complete search history.

(56) References Cited

U.S. PATENT DOCUMENTS

| | | | |
|---|---|---|---|
| 4,714,662 A * | 12/1987 | Bennett | 429/403 |
| 6,060,198 A | 5/2000 | Snaper | |
| 6,410,184 B1 * | 6/2002 | Horiuchi et al. | 429/156 |
| 6,821,671 B2 | 11/2004 | Hinton et al. | |
| 7,504,179 B2 | 3/2009 | Tanjou et al. | |
| 2003/0017380 A1 | 1/2003 | Cooper et al. | |
| 2003/0211384 A1 | 11/2003 | Hamada et al. | |
| 2004/0038122 A1 * | 2/2004 | Hisamitsu et al. | 429/120 |
| 2005/0089750 A1 | 4/2005 | Ng et al. | |
| 2005/0089751 A1 | 4/2005 | Oogami et al. | |
| 2007/0141457 A1 | 6/2007 | Amagai | |

(Continued)

FOREIGN PATENT DOCUMENTS

KR 2010081674 A * 7/2010

OTHER PUBLICATIONS

Non-Final Office Action dated Jan. 4, 2013 pertaining to U.S. Appl. No. 12/774,873, filed May 6, 2010.
Non-Final Office Action dated Feb. 6, 2013 pertaining to U.S. Appl. No. 12/853,620, filed Aug. 10, 2010.
Office Action mailed Jul. 30, 2012 related to U.S. Appl. No. 12/774,873.

(Continued)

*Primary Examiner* — Daniel Gatewood
(74) *Attorney, Agent, or Firm* — Quinn Law Group, PLLC

(57) ABSTRACT

A reversibly connected battery pack is provided. The reversibly connected battery pack includes a pair of end frames, at least one frame, a plurality of battery cells, and at least one power connector. One end frame has a positive terminal, and the other has a negative terminal. The frame(s) is positioned between the pair of end frames. Each of the plurality of battery cells has a positive tab and a negative tab. The positive tab of one of the plurality of battery cells is electrically connected to the positive terminal in the end frame, and the negative tab of another one of the plurality of battery cells is electrically connected to the negative terminal in the end frame. The plurality of battery cells are positioned in the frame(s) and the end frames. The plurality of battery cells and the positive and negative tabs are supported by the frame and the pair of end frames. There is at least one power connector electrically connecting the negative tab of one battery cell with the positive tab of an adjacent battery cell.

11 Claims, 11 Drawing Sheets

(56) References Cited

U.S. PATENT DOCUMENTS

| | | | |
|---|---|---|---|
| 2008/0193830 A1* | 8/2008 | Buck et al. | 429/120 |
| 2009/0029251 A1 | 1/2009 | Baba | |
| 2009/0142628 A1 | 6/2009 | Okada et al. | |
| 2009/0325051 A1 | 12/2009 | Niedzwiecki et al. | |
| 2010/0055993 A1* | 3/2010 | Ikeda et al. | 439/754 |
| 2010/0143782 A1 | 6/2010 | Kruger et al. | |
| 2010/0273091 A1 | 10/2010 | Brey et al. | |
| 2011/0052969 A1 | 3/2011 | Cai et al. | |
| 2011/0162820 A1 | 7/2011 | Weber et al. | |
| 2011/0274956 A1* | 11/2011 | Lin et al. | 429/99 |

OTHER PUBLICATIONS

Non-Final Office Action dated Mar. 1, 2013 pertaining to U.S. Appl. No. 12/853,521, filed Aug. 10, 2010.
Final Office Action dated Mar. 1, 2013 pertaining to U.S. Appl. No. 12/774,873, filed May 6, 2010.
Final Office Action dated Oct. 2, 2013 pertaining to U.S. Appl. No. 12/774,873, filed May 6, 2010.
Final Office Action dated May 31, 2013 pertaining to U.S. Appl. No. 12/853,620, filed Aug. 10, 2010.
Non-Final Office Action dated May 22, 2013 pertaining to U.S. Appl. No. 12/853,873, filed May 6, 2010.

* cited by examiner

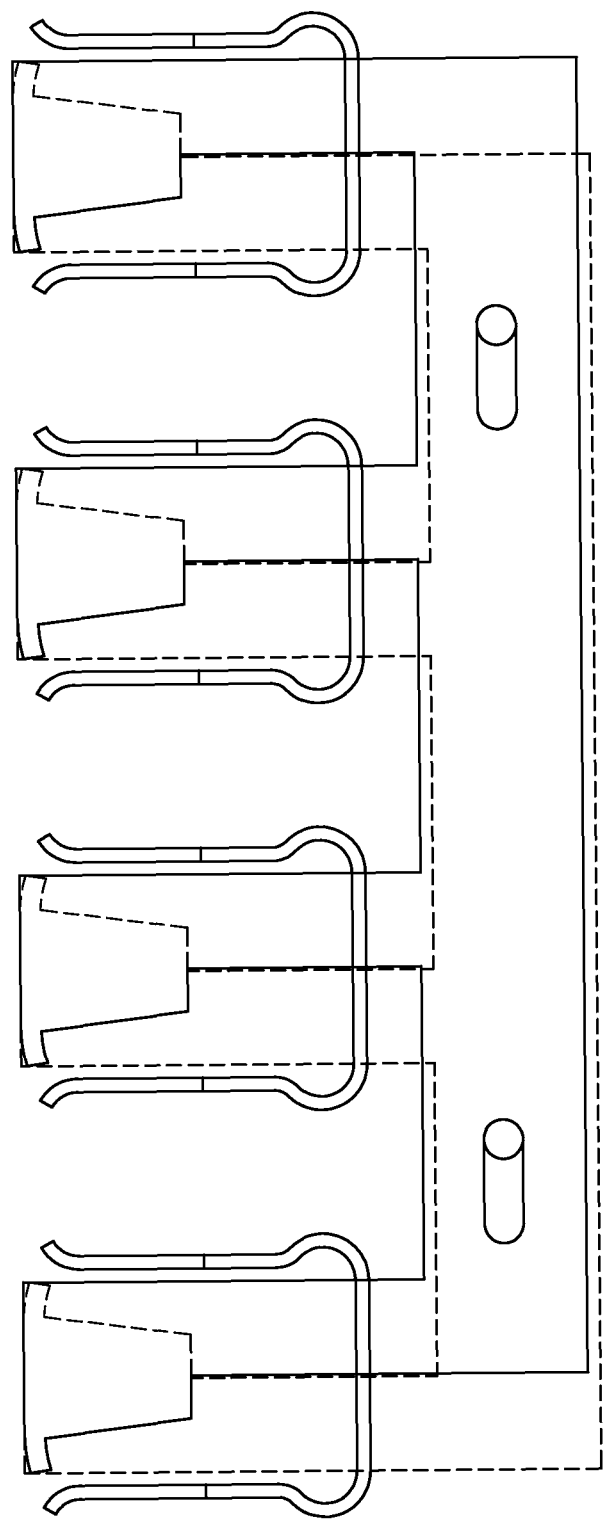

INTEGRATED STACKABLE BATTERY

BACKGROUND OF THE INVENTION

This invention relates generally to battery packs and more particularly to battery packs having reversible connections.

Currently, the battery cells in some battery packs are positioned in frames which are used to house the cells, cooling fins, and expansion material, such as foam sheets. The frames can also be used as a conduit for liquid cooling of the cells. However, they do not include any features to locate the cell. In some battery packs, cell tabs are welded to a separate interconnect board. Welding is an irreversible process which is typically performed in a secondary manufacturing process, adding time and complexity to the assembly process. These interconnect boards are sometimes plastic welded to the frames in a second welding process, adding another step to the assembly process. If the interconnect boards are welded to the frames, the frames can no longer be separated except where breaks are provided in the interconnect board.

Cooling the battery cells is complex and requires many components, including a foam sheet to control expansion and contraction. It also requires a high level of cleanliness to maintain the coolant liquid seals.

Therefore, there is a need for a battery pack that is easy to assemble and disassemble.

SUMMARY OF THE INVENTION

A reversible electrical connection to a stack of battery cells is provided. In one embodiment, the stacking of cells within the frames creates the electrical connection between cells through a buss line embedded in the frame. In a second embodiment, the electrical connection between cells is provided through an external buss line. Both methods can be easily assembled and disassembled and provide safety features by mitigating exposure to high voltage.

In one embodiment, a reversibly connected battery pack is provided. The reversibly connected battery pack includes a pair of end frames, at least one frame, a plurality of battery cells, and at least one power connector. One end frame has a positive terminal, and the other has a negative terminal. The frame(s) is positioned between the pair of end frames. Each of the plurality of battery cells has a positive tab and a negative tab. The positive tab of one of the plurality of battery cells is electrically connected to the positive terminal, and the negative tab of another one of the plurality of battery cells is electrically connected to the negative terminal. The plurality of battery cells are positioned in the frame(s) and the pair of end frames. The plurality of battery cells and the positive and negative tabs are supported by the frame and the pair of end frames. There is at least one power connector electrically connecting the negative tab of one battery cell with the positive tab of an adjacent battery cell.

BRIEF DESCRIPTION OF THE DRAWINGS

FIGS. 12A-B are an illustration of the operation of the insertion tool.

DETAILED DESCRIPTION

Figure 1:
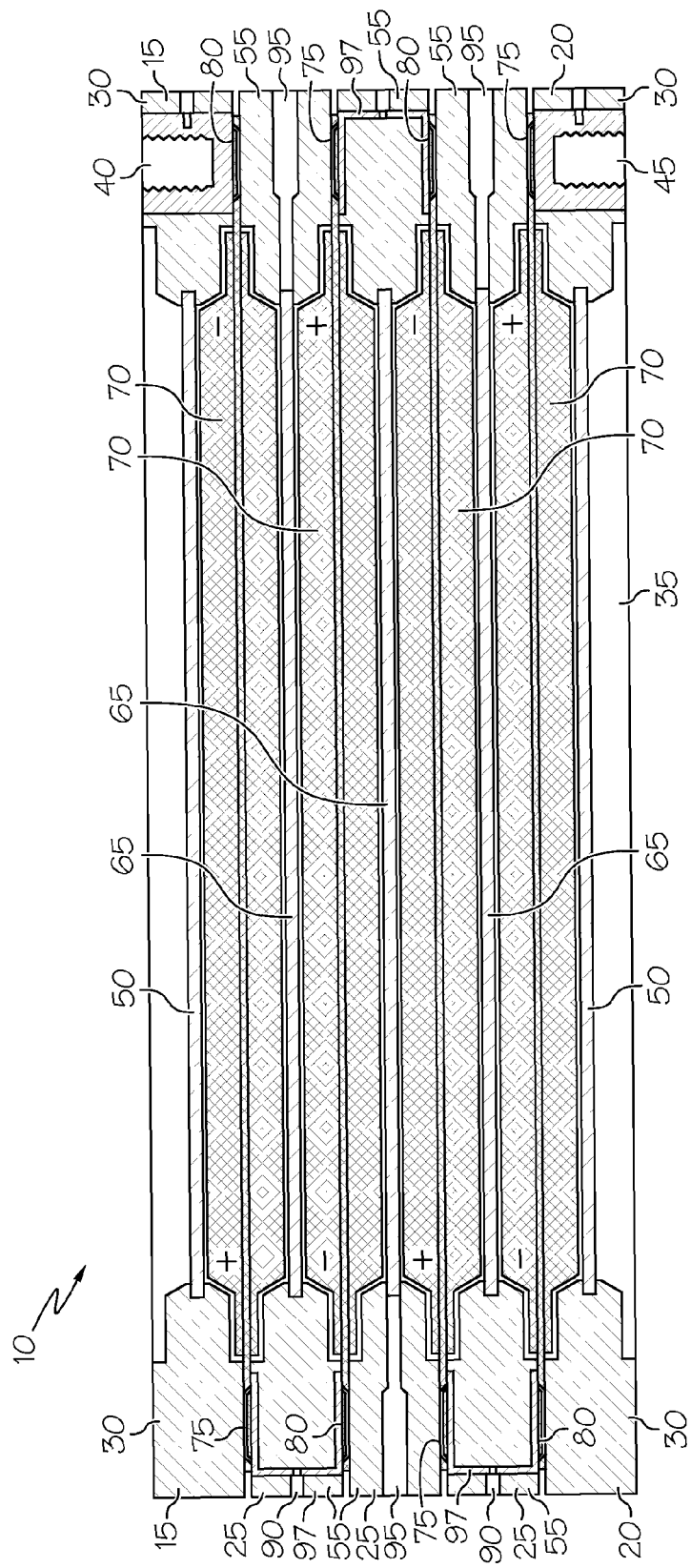
FIG. 1 is top plan view of one embodiment of an assembled battery pack.

The battery components are integrated into the frame used to house the low voltage battery cell to achieve scalability, low-cost reversibility for repair and remanufacturing, reduction of component proliferation during assembly, and reduction of assembly complexity.

The design provides a nonconductive frame to encase battery cells which has integrated molded features to satisfy the cooling and electrical requirements for power transmission and battery management. It allows an unlimited stacking of frame-cell sandwiches. In some embodiments, there are identical frames designed for error-proof stacking to assemble an arbitrary number of cells to achieve the voltage requirements for any application, with each frame providing necessary service to and from the cells. The series connections needed to form a high voltage battery system are achieved through molded power connectors in the frame or removable external power connectors. A heat exchange system can be integrated in the frame and designed to obtain nearly uniform temperature throughout the battery pack for any stack length, if desired.

The design can be manufactured in a variety of assembly systems, from manual to fully automated, to meet volume requirements at low cost, while maintaining a high level of quality during assembly. It reduces assembly cost and complexity by reducing the number of individual components and by eliminating individual flexible foam separators. The design also allows the replacement of a single cell at the dealership, eliminating the need for shipping entire battery packs, which improves repair and remanufacturing options. In addition, it improves electrical safety for assembly and/or servicing by encasing all internal potentials in the stack.

Cradle features in the frame moderately pinch and isolate the cell edges to mitigate leakage problems in the field and to assist in cell placement within the frame during assembly.

Battery stacks require series connection between cells with very low resistance. In some embodiments, high contact pressure applied by bolts or tie rods through the frame stack near the cell tabs may provide sufficiently low resistance and enable a completely reversible assembly. The cell tabs should have highly conductive properties that enable low resistance. For example, the high conductive properties can be obtained with coatings, claddings, or other methods.

The design integrates multiple components including a cooling fin, expansion material, and manifold in the frame to reduce assembly complexity. The manifold includes a channel for coolant, such as air, water, or refrigerant, to pass over the cooling fin. The size and shape of the coolant channels and the coolant path in the manifold can be designed for specific applications.

The frame design can include one or more of the following design features: optimal tab location and size; an embedded power connector with spring action contact mechanism or slot for external power connector; embedded thermal monitoring; embedded voltage monitor/cell charging wire; embedded local cell components of the battery management system; embedded heating/cooling fin including pouch contact mechanism; embedded heat exchanger; embedded surfaces to isolate tab edges to minimize leakage/shorts; and error proof assembly features.

Figure 2:
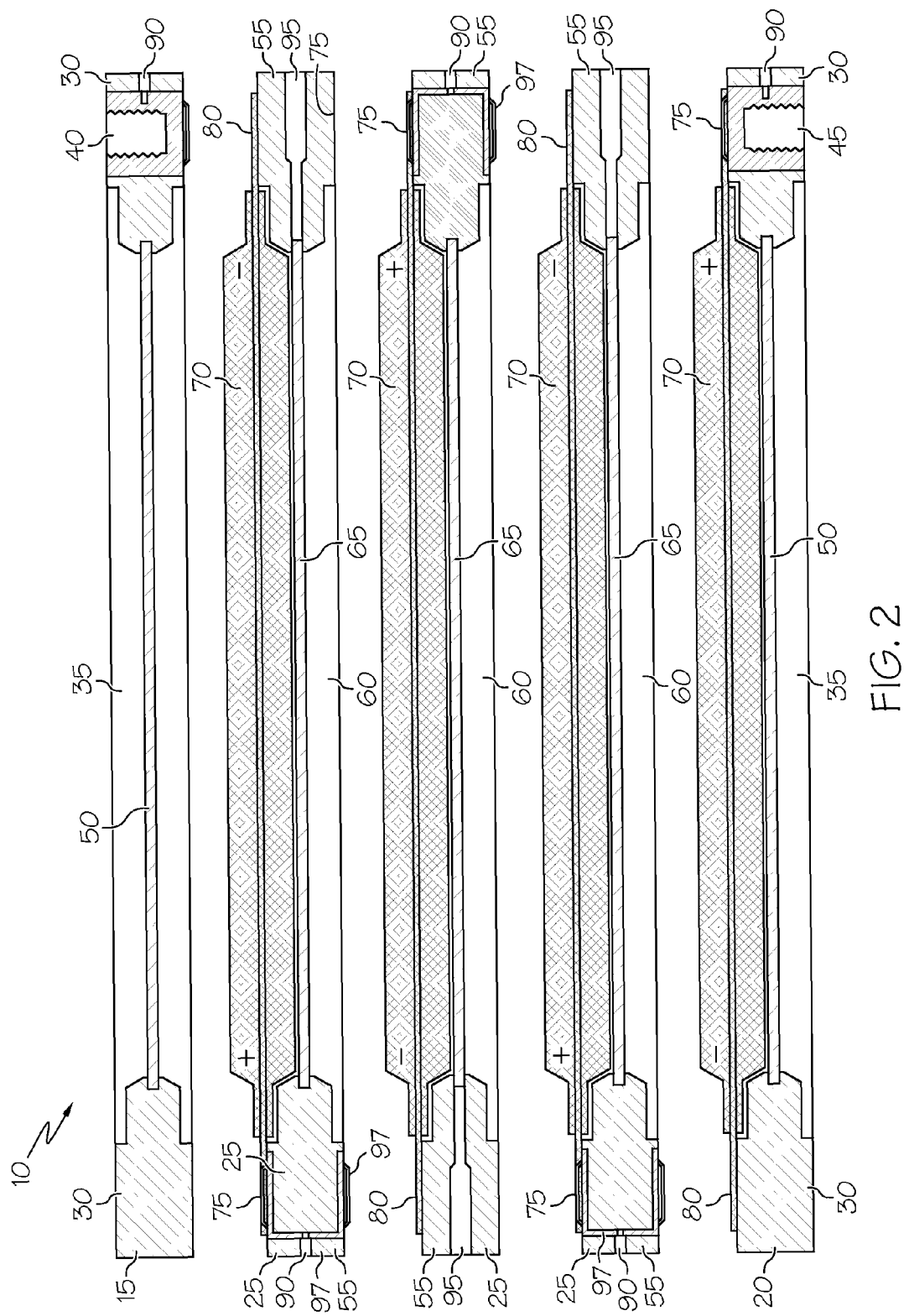
FIG. 2 is an exploded view of the embodiment of FIG. 1.

FIGS. 1-2 show one embodiment of a battery pack 10. The battery pack 10 has a pair of end frames 15, 20 and frames 25 positioned between the end frames 15, 20. The end frames 15, 20 have raised edge portions 30 surrounding an inner portion 35. The inner portion 30 is typically open as shown (i.e., like a picture frame). However, there could be a thin layer extending all or part way across the inner portion, if desired. There is a negative terminal 40 in end frame 15 and a positive terminal 45 in end frame 20. The terminals can be any suitable type of terminal including, but not limited to, threaded sockets and threaded studs.

The end frames 15, 20 can include a cooling fin 50 extending across all or a portion of the inner portion 35, if desired.

The frames 25 have raised outer portions 55 surrounding inner portions 60. The inner portion 60 is typically open as shown (i.e., like a picture frame), although there could be a thin layer extending across all or part of the inner portion. The frames 25 can include a cooling fin 65 extending partially or completely across the inner portion 60, if desired.

The cooling fins can be made of any conventional cooling material. Suitable materials include, but are not limited to, light-weight thermal conductors such as aluminum, or sandwich structures of two light-weight thermal conductors separated by a layer of compressible foam or other expansion compensator to allow for expansion and contraction of the battery cells on either side of the cooling fin caused by the charge state, heating, and cooling of the cells. It can incorporate integrated heat pipe technology, if desired.

The end frames and the frames are typically made of a light-weight, nonconductive material. Suitable materials include, but are not limited to, plastics, such as polypropylene, nylon 6-6, and other low cost materials. The frames can be fiber-reinforced for structural strength, if desired.

The frames and cooling fins can be separate parts or they can be combined, if desired. For example, the frame could be made in two pieces that snap together around the cooling fin. Alternatively, the cooling fin could be molded into the frame, such as by injection molding or the like. Alternatively, the cooling fin could be snapped into the frame, or it could be sealed to the frame using a sealing material such as santoprene.

There is at least one frame 25 in addition to the two end frames in the battery pack 10, and typically there are many. In most cases, there will be one less frame than the number of battery cells connected in series. For example, if there are 18 battery cells connected in series, there could be 17 frames. In some cases, there may be the same number of frames and cells.

Battery cells 70 are positioned in the inner portion 60 of the frames 25 and end frame 20. The battery cells 70 have positive tabs 75 and negative tabs 80. The battery cells 70 and the positive tabs 75 and negative tabs 80 are supported by the raised edge portions 55 of the frames 25 or the raised edge portions 30 of the end frame 20 depending on their location in the pack. The raised edge portions of the frames and end frames are designed to support (or cradle) the battery cell and tabs. The design of the raised portions depends on the particular battery cells being used. The cooling fins 50 and 65, if present, could also partially support the battery cells.

As shown, the positive battery tab 75 is on the opposite side of the battery cell from the negative tab 80. Having the cell tabs on opposite sides of the cell creates more uniform heat generation. When the cell tabs are close to one another or on one side, they tend to have a higher heat concentration and higher differences in temperature over the volume of the cell that can result in localized hot spots. However, these arrangements of cell tabs can be used with appropriate cooling. In addition, cell manufacturers also have cell tabs of various other configurations. The particular arrangement of cell tabs is not important, and frame assemblies can be made to match cell tabs of any configuration.

The frames and/or the end frames can optionally include voltage sensor holes 90 and temperature sensor holes 95. One desirable arrangement has the voltage sensor holes and temperature sensor holes on opposite sides of the frame, although this is not required. In addition, some frames might have only voltage sensor holes, others might have only temperature sensor holes, and some frames might not have either; however, the use of these options would increase the number of parts required. The voltage sensors and temperature sensors can be connected to a battery management system (described below) if desired. Other types of sensors could also be used, if desired. The sensor holes could be designed to accommodate a particular type of sensor, or one sensor hole could be designed to accommodate a variety of sensors.

The positive and negative tabs of adjacent battery cells are electrically connected by power connectors 97. The power connectors are made of conductive materials. The power connectors can be internal or external.

Figure 3:
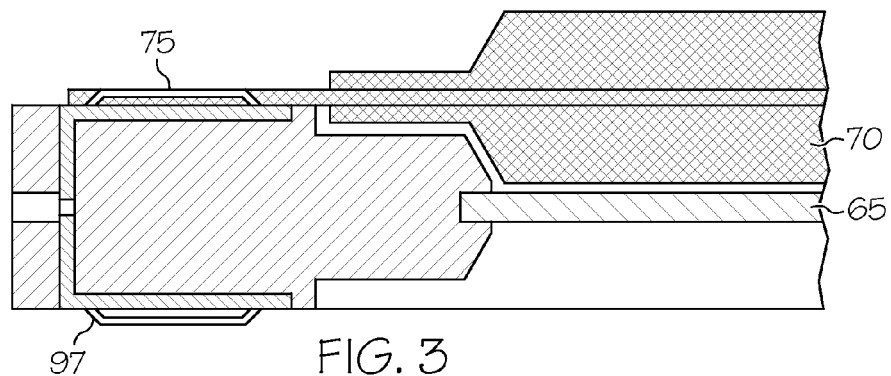
FIG. 3 is an illustration of one embodiment of an internal power connector.

FIGS. 1-3 show one embodiment of an internal power connector 97 embedded in the frame. The internal power connector 97 is generally U-shaped and extends though the frame with each leg of the U forming a contact surface on opposite sides of the frame. The internal power connector can be spring loaded to assist in obtaining good contact with the cell tab, if desired. Pressure is applied to the power connectors by, for example, bolts extending through the stack of frames, to provide the necessary contact between the cell tabs and the power connectors to obtain a low resistance connection.

Good electrical connection between the power connector and the tabs is related to the amount of surface contact area between them. One large surface area may have difficulty in making complete contact with the cell tab if the two surfaces are not parallel. For example, a high spot at one end may not allow the opposite end to move far enough to make solid contact. The surface of the power connector can be segmented by adding slits or cuts providing multiple smaller surfaces, each having increased independent movement. Consequently, a high spot on at one end will not prevent the next segment from making good contact.

In addition, the surface roughness of the connector can be modified by chemical or mechanical abrasives, or by depositing a coating on the surface.

Figure 4:
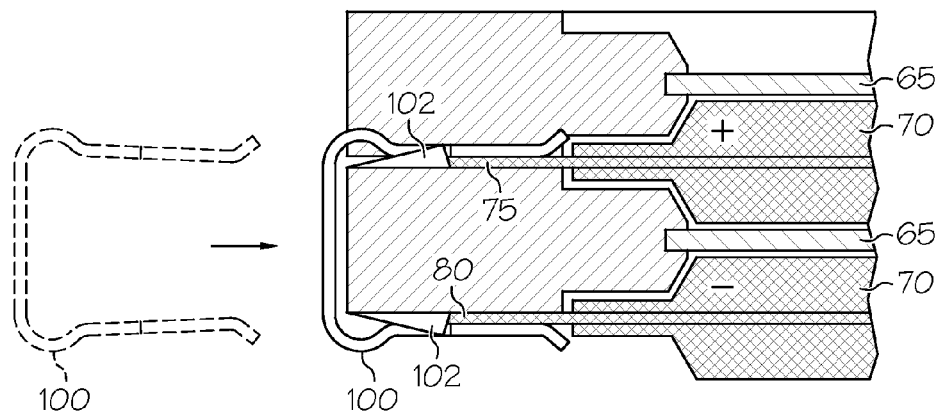
FIG. 4 is an illustration of one embodiment of a spring loaded metal clip used to connect battery cells.

One embodiment of an external power connector is a spring loaded conductive clip 100 shown in FIG. 4. The spring force of the clips is typically in the range of about 500 to about 1500 N. The clip can be made of a conductive material, including, but not limited to, metals. One example of suitable material for a clip is spring steel coated or clad (or another process) with copper and nickel.

Figure 5:
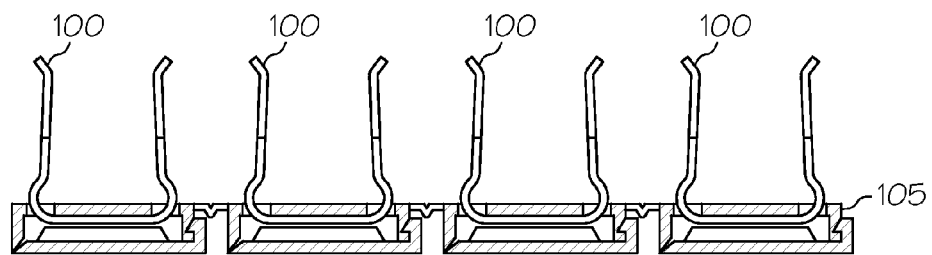
FIG. 5 is an illustration of a bandoleer of spring loaded metal clips.

A series of clips 100 can be attached to a non-conducting flexible mounting device configured as an elongate strip, or bandoleer, 105, as shown in FIG. 5. The clips are spaced along a linear dimension of the bandoleer 105 in a manner similar to a busbar so that they can be inserted into the molded slots on alternating frames that encase the stack of prismatic battery cell. In one embodiment where the positive and negative tabs are on opposite sides of the battery cell, there would be one bandoleer 105 on each side of the battery pack in order to form the necessary connections. This allows for some dimensional variation in the stack. The frame and clips can be designed to ease the assembly and disassembly process, minimize wear on the cell tab surface, and maintain low-resistance electrical conduct after assembly.

The bandoleer can be made of a non-conducting flexible material, such as a plastic. Examples of suitable plastics include, but are not limited to, polypropylene or nylon. It could be a molded part with a strip of plastic between the holder to allow some movement along its length. Instead of using the voltage sensor holes to monitor the voltage, the bandoleers can provide electrical monitor wires at each clip, which are bundled in the bandoleer for connection to a common battery management system.

The battery management system can monitor one or more conditions within the battery pack, including, but not limited to, the voltage, the current, and the temperature at selected points in the battery pack, if desired. The resulting readings can be used for a variety of purposes, such as diagnostics or running the vehicle in a different mode. During a charge cycle, the battery management system can prevent overcharging of individual cells by transferring energy using simple resistors or potentially to adjacent cells that are capable of absorbing the energy, depending on the design of the battery management system.

When external power connectors are used, the battery stack remains a low voltage (e.g., 3 V) system until the bandoleers are fully inserted and returns to a low voltage system at the moment either bandoleer is partially disengaged. This provides an opportunity for significant improvement in electrical safety during manufacturing, servicing at the dealers, and remanufacturing. Manufacturing costs can be reduced because of the significant reduction in the high voltage areas of the plant by installing the bandoleer at final assembly just before closing the cover. In addition, cell charging can be done conveniently and more economically on individual cells after assembly, but before installing the bandoleer.

The ability to disengage the high voltage by pulling the bandoleer immediately after removal of the battery cover enables more repair options, including individual cell replacement, which can allow for a greater role by dealers in the repair process.

Pressure is applied directly by the elastic properties of the clip to maintain low-resistance electrical contact. This reduces or eliminates the reliance on pressure applied through the frame stack (e.g., using one or more bolts or tie rods though the frames and end frames) which may be subject to dimensional variation in the stack.

In one embodiment, the frames and clips can include ramp 102 and notch features, respectively, to keep the clip open and mechanically prevent the clip from sliding across the cell tabs during the insertion process. A ramp 102 in the slot forces the prongs of the clip open until the notch clears the ramp, at which time the clip snaps vertically onto the cell tab surfaces. This results in zero or minimal sliding of the clip on the cell tab surface during insertion.

Figure 12B:
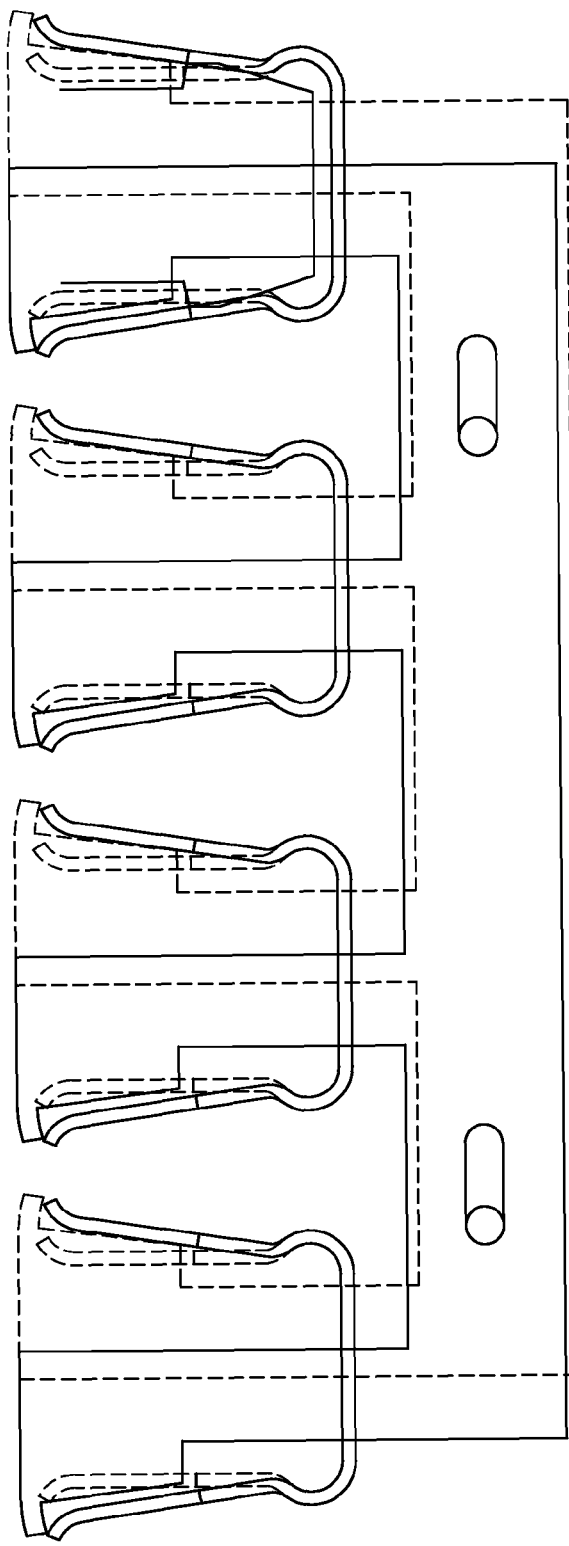

An insertion tool can be used in assembly and disassembly, as shown in FIGS. 12A-B. The tool is temporarily attached to the bandoleer, forcing the clips to open wider than is required to pass over the ramp without touching. The tool eliminates the need to apply excessive force or to tap the battery frame during assembly. The tool can also be used to disengage the bandoleer by opening the clips wide enough to clear the locking mechanism in the ramp-notch feature. The pins on the tool open and close the clip opening in the direction vertical to the tab contact, so no wear occurs on the electrode surface.

Figure 6:
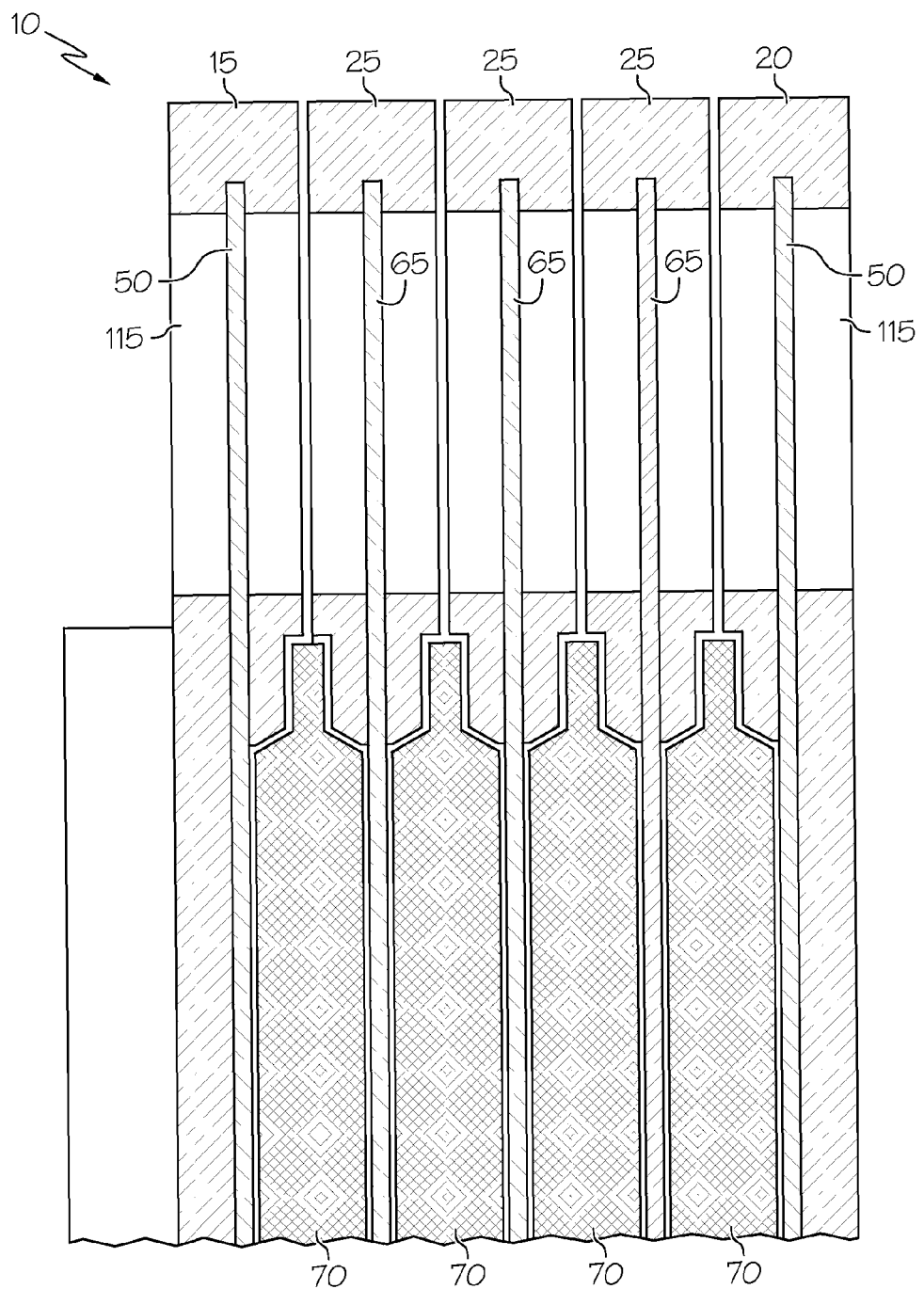
FIG. 6 is a portion of a top plan view of one embodiment of an assembled battery pack.

FIG. 6 shows a portion of an embodiment of the battery pack 10 which includes cooling channels 115 in the end frames 15, 20 and frames 25. The cooling channels are open spaces for a flow path to allow the coolant to pass over the exposed cooling fin.

Figure 7:
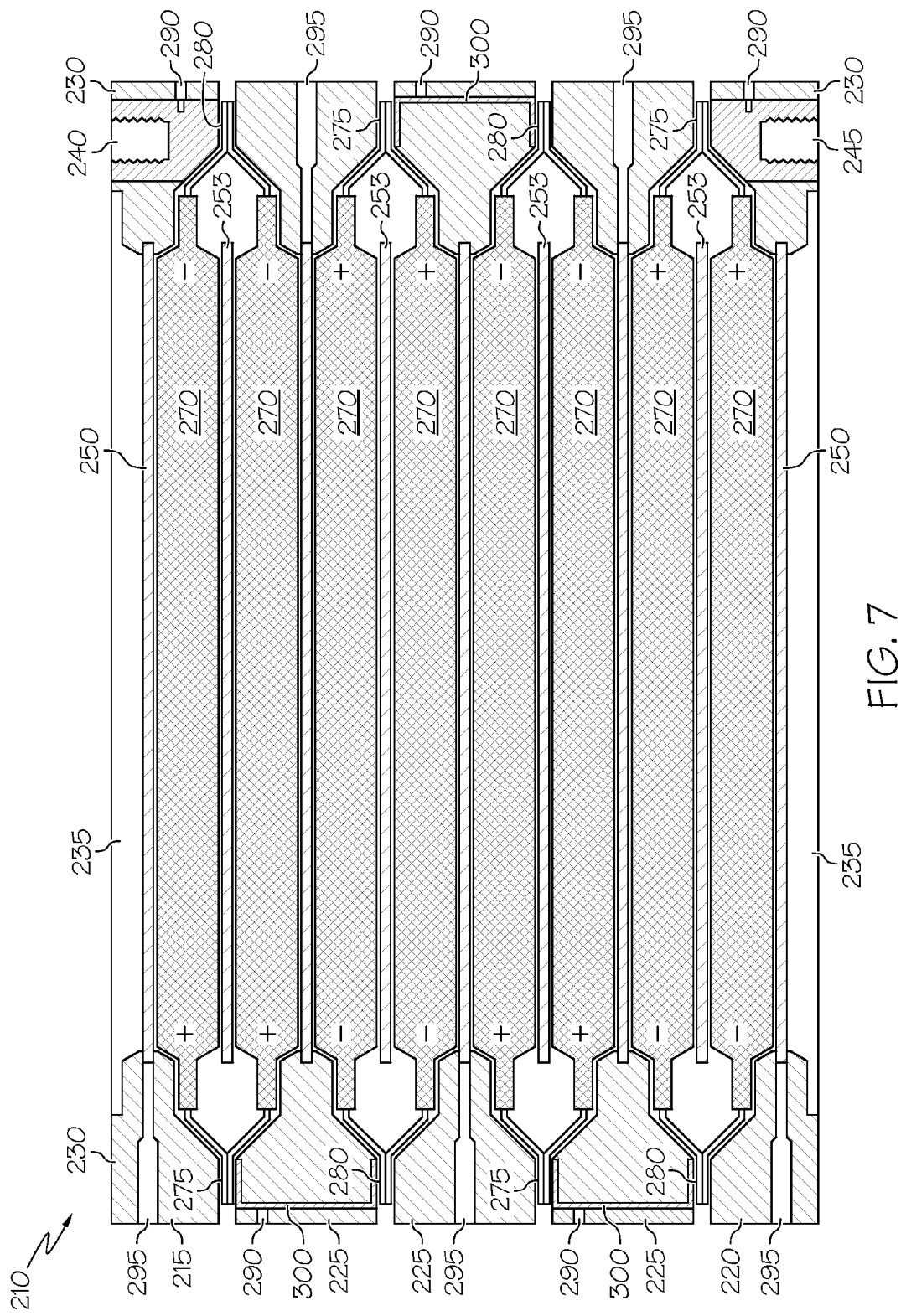
FIG. 7 is a top plan view of another embodiment of an assembled battery pack.
Figure 8:
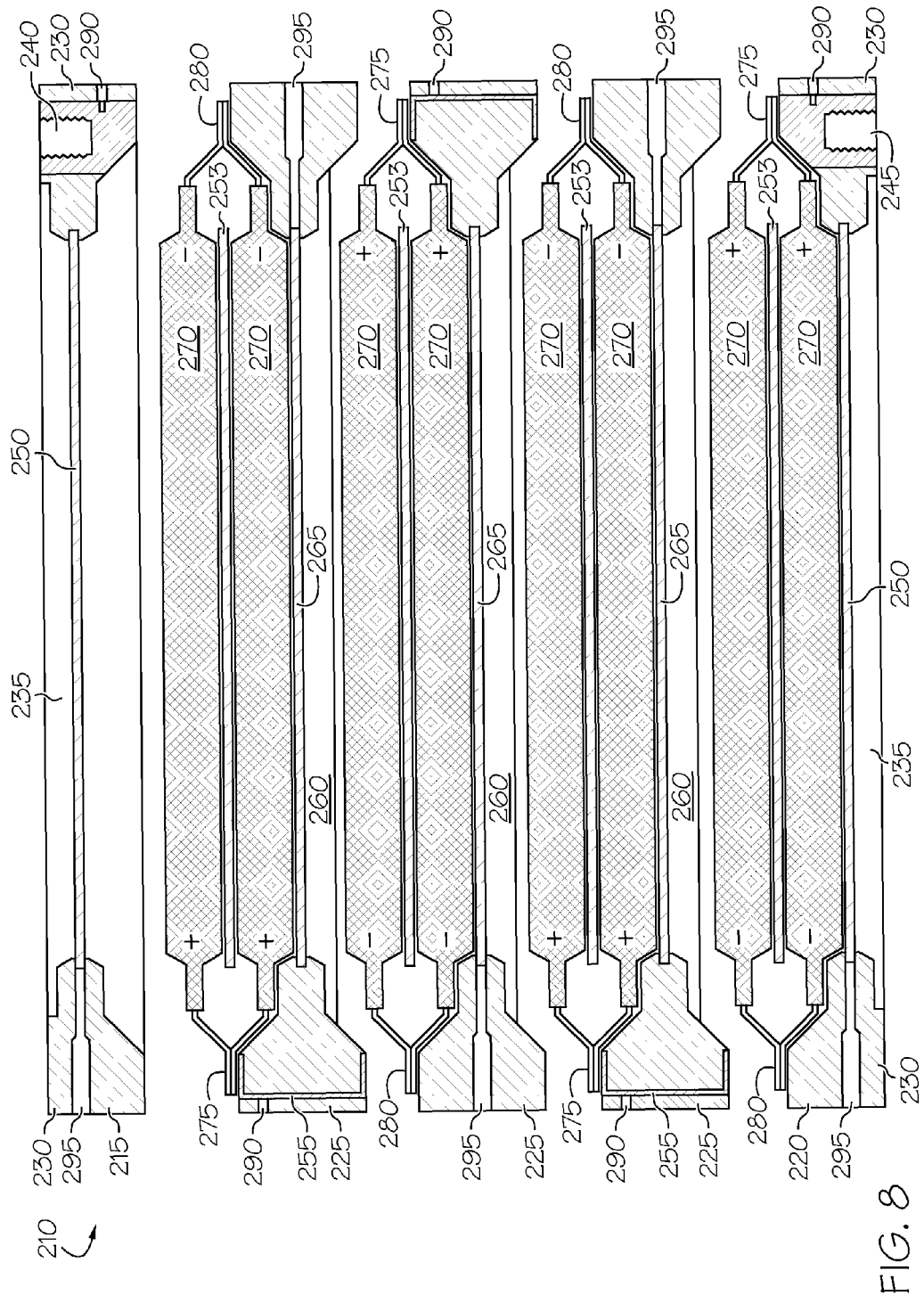
FIG. 8 is an exploded view of the embodiment of FIG. 6.
Figures 9A, 9B:
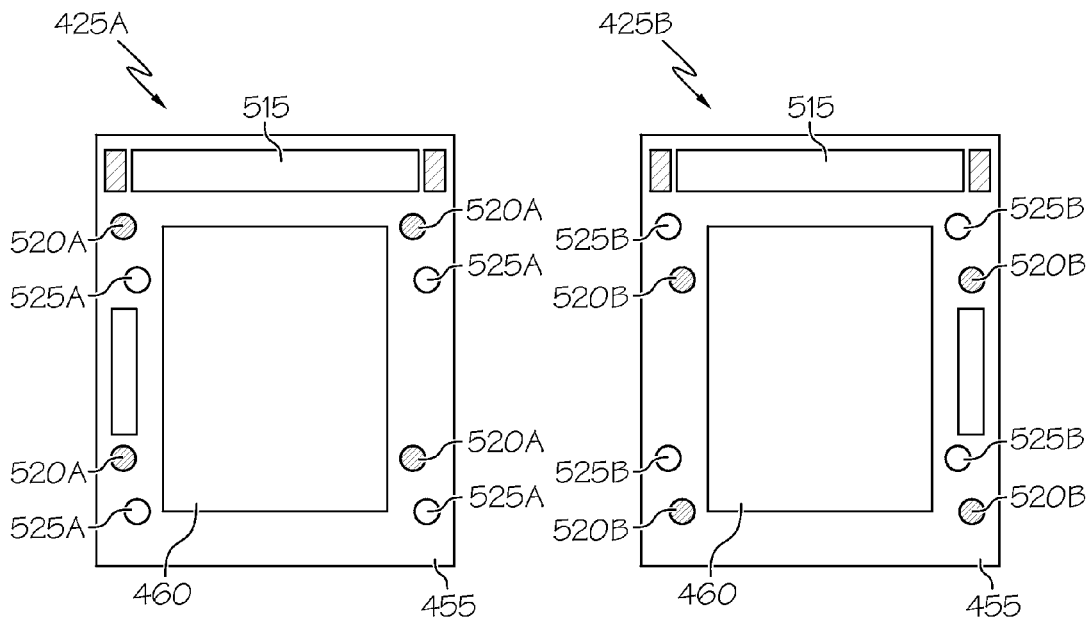
FIGS. 9A-D are an illustration of two embodiments of the frames.
Figures 9C, 9D:
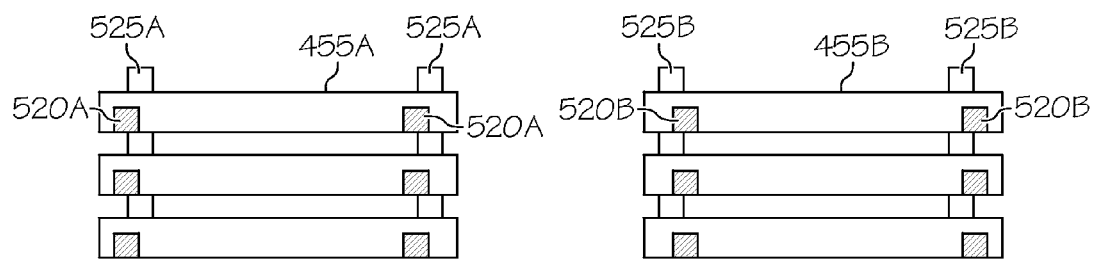

FIGS. 7-8 show another embodiment in which battery cells are connected in parallel. The battery pack 210 has a pair of end frames 215, 220 and frames 225 positioned between the end frames 215, 220. The end frames 215, 220 have raised edge portions 230 surrounding an inner portion 235. There is a negative terminal 240 in end frame 215 and a positive terminal 245 in end frame 220. The end frames 215, 220 can include a cooling fin 250 extending across the inner portion 235, if desired.

The frames 225 have raised outer portions 255 surrounding inner portions 260. The frames 225 can include a cooling fin 265 extending across the inner portion 260, if desired.

Pairs of battery cells 270 are positioned in the inner portion 260 of the frames 225 and end frame 220. The pairs of battery cells 270 have positive tabs 275 and negative tabs 280. The pairs of battery cells 270 can be separated by loose cooling fins 253, if desired.

The battery cells 270 and the positive tabs 275 and negative tabs 280 are supported by the raised edge portions 255 of the frames 225 or the raised edge portions 230 of the end frame 220. The battery cells 270 might also supported by the cooling fins 250 and 265.

The raised portions of the end frames and frames are different in this embodiment from those in the single battery cell embodiment. The frames will be wider in order to accommodate both cells and the loose cooling fins, if present.

The frames and/or the end frames can optionally include voltage sensor holes 290 and/or temperature sensor holes 295.

The positive tabs 275 and negative tabs 280 of adjacent battery cells are electrically connected by power connectors as described above, for example. The power connector can be an internal power connector or an external power connector, such as a spring loaded metal clip 300.

The frames can include error proofing features, if desired. Error proofing features help to prevent mistakes by allowing assembly to occur only is the correct way. Error proofing features are well known in the art.

FIGS. 9A-D show one example of frames with error proofing features, There are right and left frames 425A and 425B. The frames have raised edge portions 455 and inner portions 460. There are cooling channels 515. There are interlocking holes 520A and 520B and pins 525A and 525B. The interlocking pins and holes interlock the frames. The interlocking holes 520 and pins 525 can be offset on the right and left frames. The right frame could have two sets of holes and two sets of pins offset from the holes, while the left frame had two sets of pins corresponding to the holes in the right frame and two sets of holes corresponding to the pins in the right frame. The holes 520A on the right frame 425A mate with the pins 525B on the left frame 425B, and the pins 525A on the right frame 425A mate with the holes 520B. The right frames 425A and left frames 425B can be easily stacked and separated as shown in FIGS. 8C-D.

Right and left frames 425A and 425B would be alternated to make the battery pack. This arrangement makes assembly of the battery pack error proof because the offset of the pins and holes require alternating right and left frames.

Figure 10A:
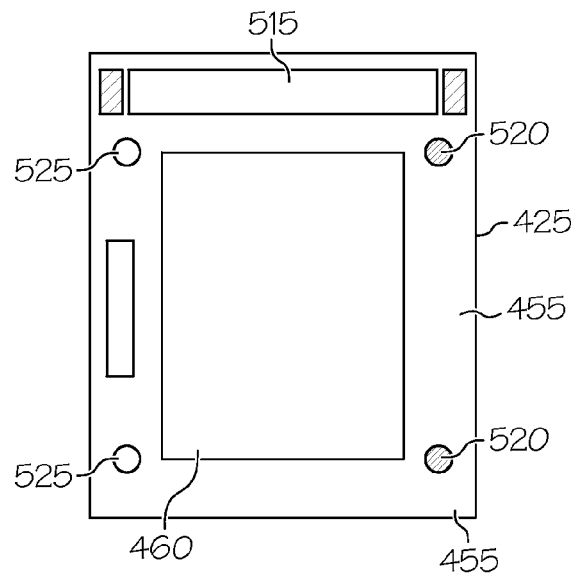
FIGS. 10A-C are an illustration of another embodiment of an frame.
Figure 10B:
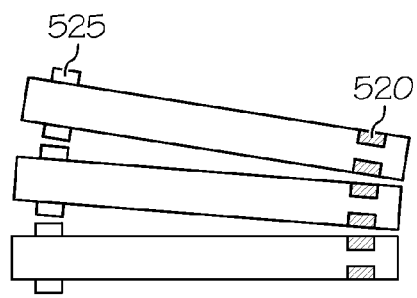
Figure 10C:
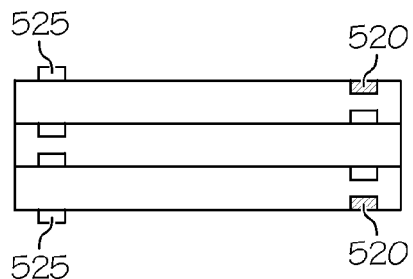

A universal frame could be used as shown in FIGS. 10-11. In the embodiment shown in FIGS. 10A-C, the frame 425 has raised edge portions 455 and inner portion 460. There are cooling channels 515. There are symmetric interlocking holes 520 and pins 525. In this arrangement, the pins are always on one side and the holes are always on the other, which makes stacking and unstacking somewhat more difficult. The frames are flipped over when manufacturing the battery pack, as shown in FIG. 10C, providing error proof manufacturing.

Figure 11A:
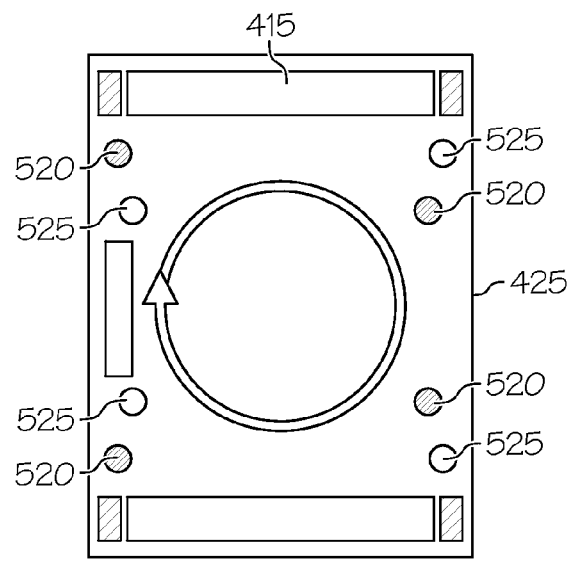
FIGS. 11A-C are an illustration of another embodiment of an frame.
Figure 11B:
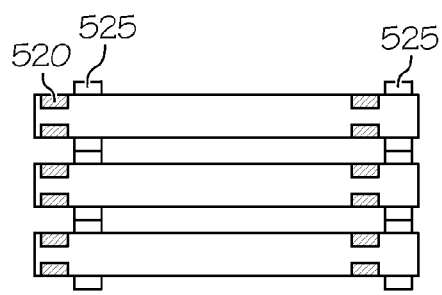
Figure 11C:
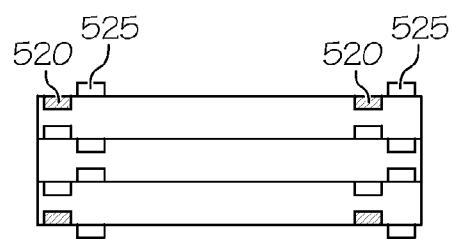

Another universal frame embodiment is shown in FIG. 11A-C. In this embodiment, there is a diagonally symmetric design of pins 525 and holes 520. The frames can be easily stacked and unstacked because they are pin to pin, as shown in FIG. 11B. Every other frame is rotated 180°, providing error proof manufacturing.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A reversibly connected battery pack comprising:
   a pair of end frames, one end frame having a positive terminal and the other end frame having a negative terminal;
   at least one frame positioned between the pair of end frames such that a stackable relationship between the pair of end frames and the frame is formed thereby;
   a plurality of battery cells, each of the plurality of battery cells having a positive tab and a negative tab disposed on opposite sides of the battery cell such that the positive tab of one of the plurality of battery cells is electrically connected to the positive terminal, and the negative tab of another one of the plurality of battery cells is electrically connected to the negative terminal, the plurality of battery cells positioned in the frame and the pair of end frames such that the plurality of battery cells and the positive and negative tabs are supported by the frame and the pair of end frames such that each of the plurality of battery cells are independently removable from the battery pack; and
   a plurality of external power connectors providing electrical connection between the cells through an external buss line, each external power connector comprising a spring-loaded conductive clip removeably inserted substantially within said at least one frame such that a contact surface is formed on opposite stackable sides of said at least one frame and each external power connector contacts and electrically connects the negative tab of one of the plurality of battery cells and the positive tab of an adjacent one of the plurality of battery cells, without reliance on stacking pressure.

2. The battery pack of claim 1 wherein the spring loaded metal clip has at least two elastic prongs, the prongs of the spring loaded conductive clip removably inserted in a slot in the frame.

3. The battery pack of claim 2 wherein there are a plurality of spring loaded conductive clips, and wherein the plurality of spring loaded clips are attached along an electrically non-conducting flexible mounting device.

4. The battery pack of claim 2 wherein the slot has a ramp and the spring loaded metal clip has a notch in the prongs, and wherein the ramp expands the prongs until the notch clears the ramp and the prongs snap onto the positive and negative tabs.

5. The battery pack of claim 1 further comprising a cooling fin positioned in the frame, or in one of the end frames, or both.

6. The battery pack of claim 1 wherein the end frames or the frame further include a raised edge portion and at least one opening in the raised edge portion for receiving a sensor.

7. The battery pack of claim 1 wherein two battery cells are positioned in the frame, or one of the end frames, or both, and wherein the positive tabs of the two battery cells are electrically connected to each other and the negative tabs of the two battery cells are electrically connected to each other.

8. The battery pack of claim 7 further comprising a cooling fin positioned between the two battery cells.

9. The battery pack of claim 1 further comprising complementary interlocking pins and holes on the frame, or one of the end frames, or both.

10. The battery pack of claim 1 further comprising a plurality of internal power conductors and at least one bolt or tie rod extending through the pair of end frames and the frame.

11. The battery pack of claim 1 wherein there is a cooling channel opening in the frame, or one of the end frames, or both.

* * * * *